(12) United States Patent
De Spiegeleer et al.

(10) Patent No.: US 7,689,764 B1
(45) Date of Patent: Mar. 30, 2010

(54) NETWORK ROUTING OF DATA BASED ON CONTENT THEREOF

(75) Inventors: Kristof De Spiegeleer, Knokke-Heist (BE); Koen D'Hondt, The Hague (NL)

(73) Assignee: Symantec Operating Corporation, Mountain View, CA (US)

( * ) Notice: Subject to any disclaimer, the term of this patent is extended or adjusted under 35 U.S.C. 154(b) by 143 days.

(21) Appl. No.: 11/404,105

(22) Filed: Apr. 13, 2006

(51) Int. Cl.
*G06F 12/00* (2006.01)
(52) U.S. Cl. .................................................. 711/108
(58) Field of Classification Search ................ 711/144, 711/108, 162, 154; 345/745
See application file for complete search history.

(56) References Cited

U.S. PATENT DOCUMENTS

| | | | | |
|---|---|---|---|---|
| 7,146,429 | B2 * | 12/2006 | Michel | 709/238 |
| 7,257,104 | B2 | 8/2007 | Shitama | |
| 7,257,643 | B2 * | 8/2007 | Mathew et al. | 709/238 |
| 2001/0045962 | A1 * | 11/2001 | Lee et al. | 345/745 |
| 2009/0060165 | A1 * | 3/2009 | Dani et al. | 379/265.13 |

* cited by examiner

*Primary Examiner*—Pierre-Michel Bataille
(74) *Attorney, Agent, or Firm*—Meyertons, Hood, Kivlin, Kowert & Goetzel, P.C.

(57) ABSTRACT

A system may be provided which is operable to determine a routing node for a data object. The system can comprise an identifier generator operable to generate an identifier for the data object on the basis of data content thereof, and a lookup engine operable to compare the identifier for the data object to a routing table to determine a routing node for the data element.

16 Claims, 9 Drawing Sheets

| CONTENT ROUTER | FINGERPRINT RANGE |
|---|---|
| 1 | 0000 - 3FFF |
| 2 | 4000 - 7FFF |
| 3 | 8000 - BFFF |
| 4 | C000 - FFFF |

NETWORK ROUTING OF DATA BASED ON CONTENT THEREOF

FIELD

The present invention relates to routing, and in particular, but not exclusively to routing of data within a data archival and/or backup environment on the basis of the content of the data.

BACKGROUND

In data archival and/or backup environments, there is often a need to store many data objects such within an archival/backup system. As the total stored volume increases, the performance within the archival/backup system can decease markedly.

In some data archival and/or backup systems, such as conventional content addressable storage systems, a volunteer-based lookup system is used. In such a system, a lookup for storage and/or retrieval uses a broadcast message to indicate that a particular file needs storing. The broadcast message is sent to all storage nodes, and a node replies ("volunteers") to indicate that it will store that file. For restorage (or retrieval), a broadcast message identifies the stored data and the node having that data replies ("volunteers") to indicate that it has stored the original data and thus receives the data for restorage (or returns the stored data in a retrieval situation). As the data volume increases, the number of broadcasts increase to the point where the majority of the bandwidth of the system can be used up by the broadcasts with very little remaining for actual data transfer to or from storage. In some known systems, the slowdown becomes particularly marked once the total number of stored files reaches approximately 50 million.

Conventional systems typically use a storage controller to manage the broadcast requests to the storage nodes. In some systems, the controller receives a data file for storage from a storage agent and calculates an identifier for the file before broadcasting the identifier to all storage nodes. In other systems, the agent provides the identifier to the controller for the controller to broadcast to the storage nodes. Dependent upon the result of the broadcast system, the controller then causes the file to be stored to a storage node. In both of these systems, the controller is a bottleneck in the storage system and can easily have its entire capacity taken up with broadcasting requests, thereby severely slowing the rate of actual data storage and/or retrieval.

The present invention has been made, at least in part, in consideration of drawbacks and limitations of such conventional systems.

SUMMARY

Viewed from a first aspect, the present invention provides a system operable to determine a routing node for a data object. The system can comprise an identifier generator operable to generate an identifier for the data object on the basis of data content thereof, and a lookup engine operable to compare the identifier for the data object to a routing table to determine a routing node for the data element. Thereby, data can be stored and retrieved on the basis of its content, allowing direct addressing of a responsible node. Thus the use of a broadcast to find a responsible node can be avoided, enabling bandwidth usage to be optimised to data transfer.

In one embodiment, the data element can be a data file or a data file segment. In one embodiment, the identifier generator can operable to calculate a checksum value for the data object, such that the checksum value of the data object is the identifier. This provides an identifier system which enables every possible data object to be uniquely identified. Also, in this way, the load on different storage nodes can be balanced substantially equally without separate load balancing effort to manage nodes.

In one embodiment, the routing table contains an indication of a routing node for every possible identifier value. Thus the routing table can be entirely predetermined such that there is no need to update the table to take account of new data objects.

Viewed from another aspect, the present invention provides a distributed storage system. The system can comprise a storage agent operable to perform a look-up in a routing table to determine a routing node for a data object on the basis of an identifier therefore, the identifier for the data object being based on data content thereof, and to send a message including the identifier relating to that data object to the identified routing node. The system can further comprise a plurality of routing nodes, each operable to perform a look-up in a routing table to determine a further routing node for a data object described in an identifier included in a message received at the routing node, and to forward the message including to the identified further routing node. At least a subset of the routing nodes can each be operable to store data objects having an identifier within a predetermined range, and the routing table for each such node can indicate that the further routing node is the current node for identifiers within said predetermined range. Thereby data objects for storage can be routed about a distributed storage system on the basis of data object content, allowing direct routing to a responsible node. Thus the use of a broadcast to find a responsible node can be avoided, enabling bandwidth usage to be optimised to data transfer.

In one embodiment, the routing table at the agent and the routing tables at the routing nodes are different. Thus routing though the system can be managed on a point to point basis.

In one embodiment, the data element is a data file or a data file segment. In one embodiment, the identifier is a checksum value for the data object. This provides an identifier system which enables every possible data object to be uniquely identified. Also, in this way, the load on different storage nodes can be balanced substantially equally without separate load balancing effort to manage nodes.

In one embodiment, the routing table at the storage agent contains an indication of a routing node for every possible identifier value. Thus the routing table can be entirely predetermined such that there is no need to update the table to take account of new data objects.

In one embodiment, the routing table at each routing node contains an indication of a routing node for every identifier value which can be caused to arrive at that routing node. Thus where a routing node can only receive messages for a subset of all possible identifiers, due to the action of routing tables previously used to route a message, the table can be tailored to the requirements of the particular node.

In one embodiment, the storage agent is operable to use two routing tables to determine a routing node, and wherein at least each routing node which is directly addressable by the storage agent is operable to use two routing tables to determine a further routing node. Thus an environment where multiple nodes may need to receive a message for a particular identifier can be established. For example, it may be necessary to have two nodes storing each data element to create a mirrored system In one embodiment, a first routing table indicates a new routing node for the identifier and wherein a second routing table indicates an old routing node for the identifier. This allows a dynamic alteration to the storage responsibilities of particular nodes to be made. While the alteration is being made, both old and new nodes associated with a particular identifier can be found within the system.

In one embodiment, one of the two routing tables includes at least one routing node which is a member of the subset of routing nodes and does not currently have a copy of all data described in that routing table. Thus, a query directed to the new node will not necessarily produce a correct result as the query may relate to data which has not yet been moved or copied to that node. In this circumstance, the old node can also be queried to ensure that the system retains a consistent state.

In one embodiment, at least one routing node of the at least a subset of routing nodes is operable to store a data object in a storage element of the routing node. In one embodiment, at least one routing node of the at least a subset of routing nodes is operable to store a data object in a storage element directly or indirectly attached to the routing node. Thus a node which has responsibility for data elements having identifiers in a given range may store the data elements locally or remotely.

BRIEF DESCRIPTION OF THE FIGURES

Particular embodiments of the present invention will now be described, by way of example only, with reference to the accompanying drawings in which like parts are identified by like reference numerals.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

SPECIFIC DESCRIPTION

Figure 1:
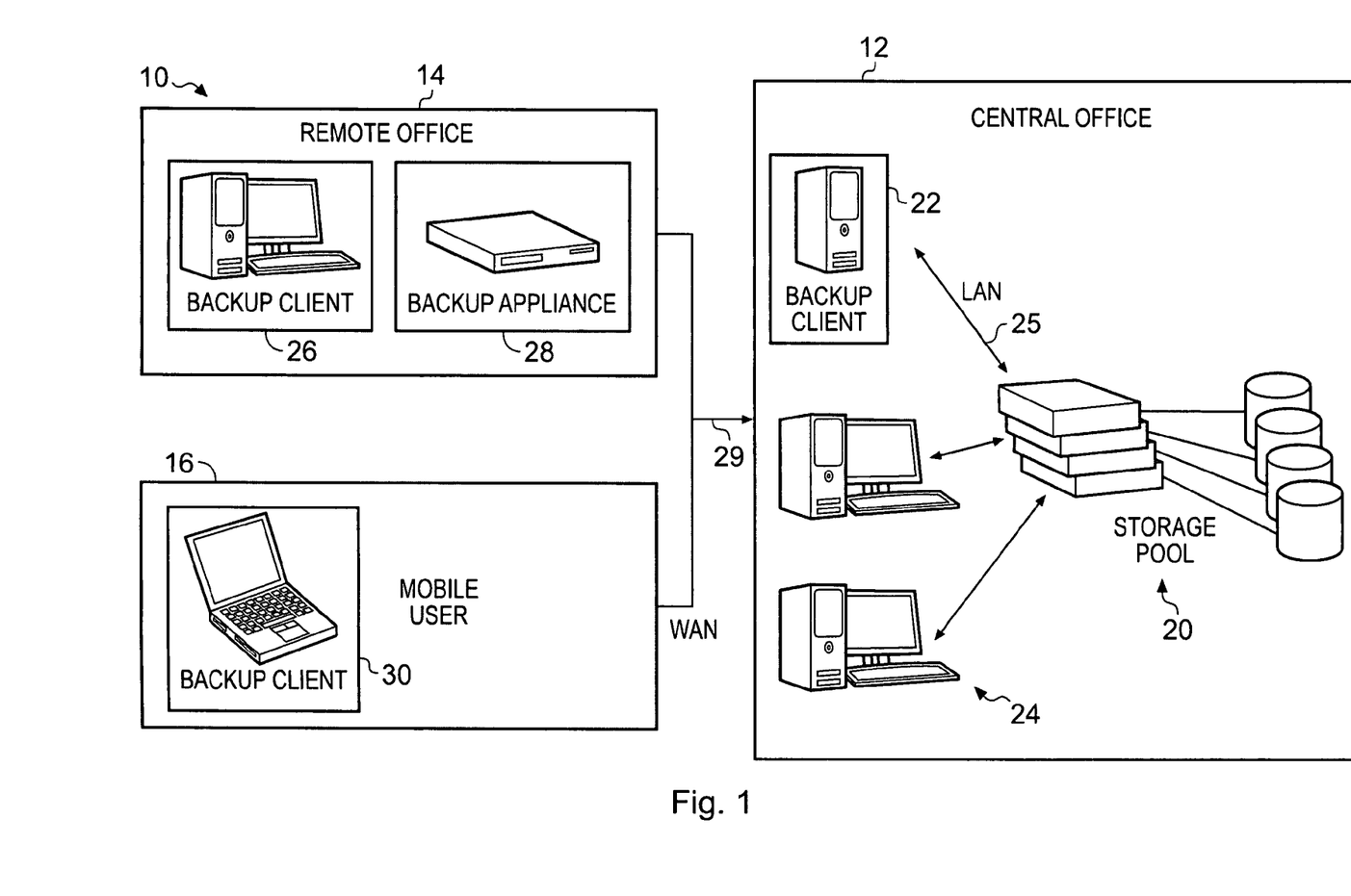
FIG. 1 shows a schematic representation of a distributed computing environment in which a data backup process may be used.

As shown in FIG. 1, a distributed computing environment 10 may include a central office 12, and may also include one or more remote offices 14 and/or one or more remote users 16.

The central office 12 may include a storage pool 20 into which data may be backed up. Management of a backup process may be performed by a backup client 22 on behalf of one or more local workstations 24. Backup data can be passed to the storage pool 20 via a LAN (local area network) 25

A remote office 14 may include one or more backup clients 26, which may be dedicated backup coordinators, or a backup client may be provided on workstation. By means of this backup client 26, data can be backed-up onto a remote office backup appliance 28. The backup appliance 28 can then transfer backup data to the storage pool 20 at the central office over WAN (wide area network) link 29.

A mobile user 16 may be provided with a backup client 30 to run on a remote terminal. This backup client 30 can send backup data to the storage pool 20 of the central office 12 via the WAN link 29.

In the present example, the amount of backup data to be transmitted over the LAN 25 and WAN 29 is limited by ensuring that only unique data is sent to the backup storage pool 20. Techniques for achieving this will be explained in more detail below.

Figure 2:
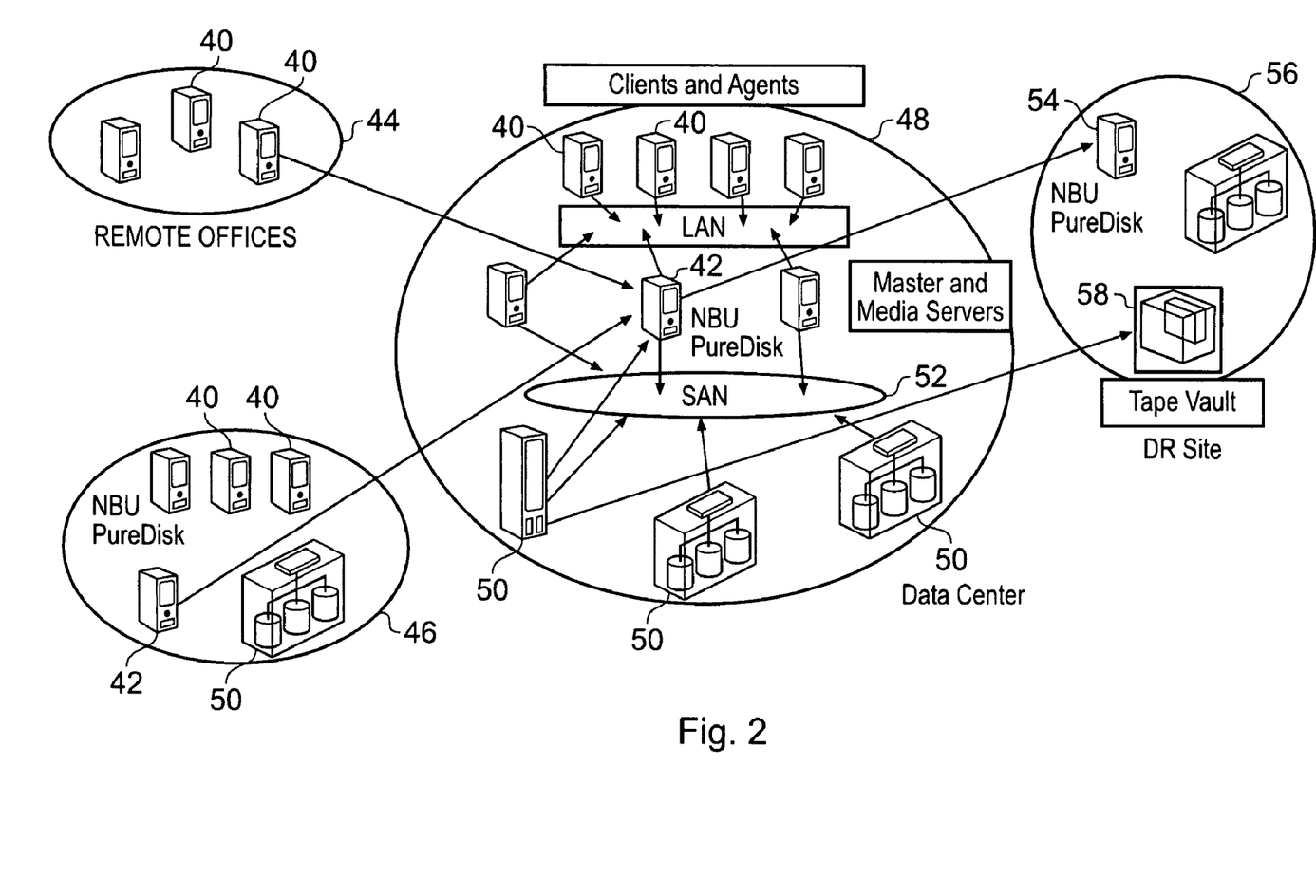
FIG. 2 shows a schematic representation of another distributed computing environment in which a data backup process may be used.

FIG. 2 shows another example implementation of a distributed computing environment. In this example, some workstations and mobile users are associated with respective local backup servers, each of which is operable to communicate with a data centre where backup storage is performed.

As shown in FIG. 2, in the present example, each computer system 40 which is to be included in the backup system runs a backup client, which may also be referred to as an agent. Each local agent identifies new and changed files or file segments as they are created and calculates a fingerprint for each file or file segment. The agents can be configured to ignore files which do not require backup such as, for example, print spool files, operating system file or temporary files.

In the present example, files larger than a predetermined threshold are divided into segments. This allows large files to be backed up more efficiently. For example, a file such as an MSOutlook™ .pst file typically contains a large amount of data which remains constant and has new data appended thereto when a user sends or receives an email or makes a calendar entry, for example. Thus, when a backup operation is performed in segmented fashion, all of the segments at the beginning of the file which are unchanged need not be backup up again. This process is illustrated in FIG. 3.

Figure 3:
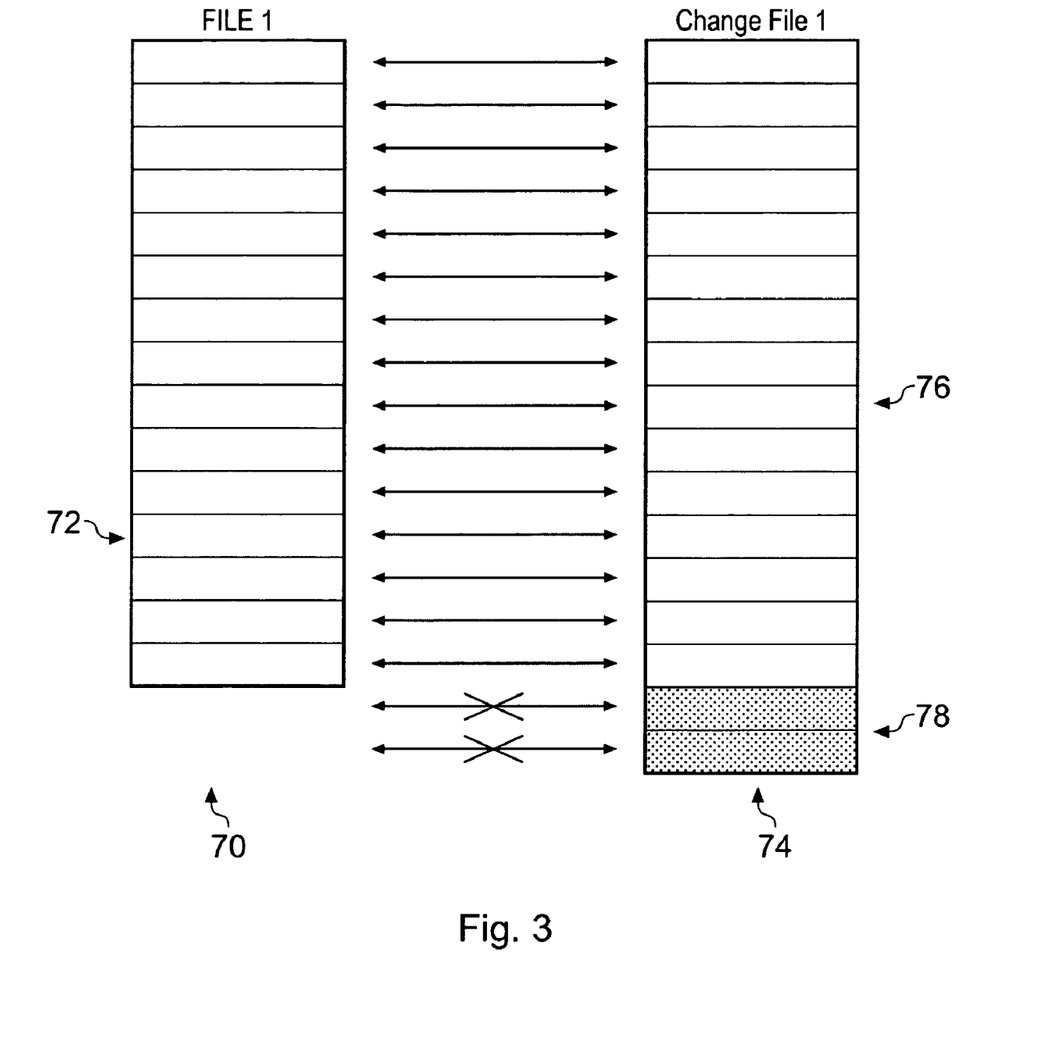
FIG. 3 shows a schematic representation of how a data file may be modified between two time points.

As shown in FIG. 3, a file 70 when last backed up was backed up as a number of backup segments 72. When a next backup operation is performed the file has increased in size to new file 74. During this backup operation, a backup agent again considers the file as a number of segments, each of which has a fingerprint calculated therefor. By comparing these fingerprints to the fingerprints included in previous backups, it can be determined that all of segments 76 have previously been backed-up and so do not require re-storing in a backup system. On the other hand, the new segments 78 have not previously been backed-up and so can be sent for backup storage. By using such a technique, the amount of data sent for backup storage on a backup operation can be reduced massively from a system where all changed files are sent for backup every time.

In the following description, the words file and segment may be used interchangably to refer to backup data units. It will be appreciated that where a file is smaller than the predetermined segment size, the file can be considered to be segmented into a single segment. In the present examples, a variety of segment sizes can be used. As will be appreciated smaller segment sizes increase the efficiency of the backup process but increase the processing workload by the backup agent. In some examples, segment sizes of 32 kbytes, 64 kbytes or 128 kbytes can be used.

The fingerprint determined by the agent uniquely identifies the file or file segment. Thus no two non-identical files or segments can have the same fingerprint, and identical files or segments always have the same fingerprint. In the present example, the fingerprint is calculated using a hash function. Hash functions are mathematical functions which can be used to determine a fixed length message digest or fingerprint from a data item of any almost size. A hash function is a one way function—it is not possible to reverse the process to recreate the original data from the fingerprint. Hash functions are relatively slow and expensive in terms of required processing power compared to other checksum techniques such as CRC (Cyclic Redundancy Check) methods. However hash functions have the advantage of producing a unique fingerprint for each unique data set, in contrast to CRC methods which can produce the same result from multiple different data sets. Examples of hash functions which can be used to calculate the fingerprint in the present example include MD5, SHA1 and the so-called SHA2 "family" (including SHA224, SHA256, SHA 384 and SHA 512). Such hash functions produce a fingerprint (sometimes termed a "digest") which may typically be of between 128 and 1024 bits in length. Thus, as will become apparent, using only this very small representation of a much larger file or file segment, the file or segment can be tested for inclusion in a backup process with only minimal network traffic being required to carry this small signature between entities in the backup system.

The agent at each workstation 40 then identifies the files or segments which are new and unique to that workstation. Thus, if a newly created file or segment at the workstation in fact is an exact copy of a file or segment previously backed-up, then the agent knows not to send that segment for backup again.

Once the agent has identified a unique segment at the workstation 40, the fingerprint for that segment can be sent to a backup server 42, where its uniqueness can again be tested. This re-test is performed to determine whether the file which is unique to a particular workstation 40 is also unique to all workstations which that backup server 42 services. The backup server may be a local backup server as shown in remote office 46 or as shown in central network 48 with respect to the workstations 40 located within the central network 48. Alternatively, the backup server may be a remote backup server as shown in central network 48 with respect to the workstations 40 located at remote office 44. Where a workstation 40 is a mobile workstation such as a laptop, the backup agent on the mobile workstation may be configured always to connect to the same backup server, or may connect to whichever backup server is physically closest to the mobile workstation at a given time.

This process of sending a fingerprint to a higher level authority within the backup structure can be continued until the highest level authority is reached. In a large system, this might be a central backup server to which a number of local backup servers are connected. In a small system, there might be only a single backup server to service all workstations. If the fragment is determined to be unique within the backup system, the originating workstation agent can be instructed to send the actual data segment for backup.

Segments which are not unique may also have their fingerprint sent to a backup server by a backup agent. This may be the case in a system where a data retention policy is defined, to ensure that a file or segment is maintained in backup storage for a minimum period after the last time it was present on any workstation within the backup environment. In some examples it may also be necessary to ensure that all segments of a given file are present in the backup system until the expiry of a data retention requirement for that file. Thus all segments of a file may need to be kept until the end of a data retention policy period, not just the last modified segments thereof.

It will be appreciated that the workstations 40 of the present example may include file or application servers where data requiring backup is stored. For example, it may be the case that file servers are used to store many data files, so the content of these may be required to be backed up. In the example of an application server such as a MSExchange™ server, the application server may store data relating to the application and may therefore require backup. Also, application files, whether located at a workstation or a server, may require backup coverage, for example to provide a straightforward method for recovery of custom settings or rebuilding of a workstation or server following a system failure.

As mentioned above, a data retention policy may apply to data within a computer system. Such a policy may be a policy determined by a company or may be imposed by a regulatory authority. Regulator imposed policies may apply, for example in respect of financial information and legal information. For this reason, it may be desirable for a workstation backup agent to include deleted files in the backup operation to ensure that a file with an existence on a workstation of less than one backup interval is still included in the backup process.

As will be appreciated, by performing the backup process in terms of using a fingerprint typically of the order of a few tens of bits in size to determine which segments actually need backing up, the amount of data transferred over network connections between the workstations and backup servers is much reduced compared to a system where data identified for backup is sent for storage before it is determined whether storage of that data is actually required.

Returning to FIG. 2, the backup servers 42 may cause the data for backup to be stored into a storage arrangement such as a storage server 50. The storage servers 50 may be standalone storage servers or may be part of a storage infrastructure such as a SAN (storage area network) 52. In alternative examples the backup server 42 may include the storage for backed up data.

To provide redundancy and greater security and availability for backed up data, a storage server 42 may consist of a mirrored pair of storage servers, with one active and the other acting as a hot standby, ready to take over in case of a failure of the active backup server. A remote mirror 54 may be provided, for example at a remote site 56, to provide resiliency against failures affecting the location of the active backup server. Such a remote site may also be used to make and/or keep backup copies of the backed up data, for example in backup magnetic arrangements or using conventional backup techniques such as a tape vault 58.

Thus there has been described a number of examples of a backup environment for using data fingerprints to identify files and/or segments for backup and to backup only unique files and segments so as to achieve maximum efficiency in usage of backup storage volume.

In order to provide a means for accessing the files and segments in the backup system, the files and segments can be stored in an indexed file system or database structure which allows a file or segment to be identified and retrieved by a search on its fingerprint. The fingerprint may also be considered to be a "signature" of the data file or segment. Thereby a simple file system or database structure can be used for the files and segments, thereby allowing a swift search and retrieval process.

In order to facilitate searching the contents of a backup store of the type described above, both to assess the contents of the store, and to retrieve data from the store, a database of metadata can be provided. The database of metadata or "metabase" can store data describing each file stored into the backup system. Such data may include information such as filename, last edited date, created date, author, file size and keywords representative of the content of the file. Also stored in the metabase can be the fingerprint (or fingerprints) for the file (or each segment of the file). Thereby, a user searching the metabase for files edited on a particular date can run a query on the metabase, and any returned results can enable the files in the backup system to be retrieved by means of their uniquely identifying fingerprint. A system constructed in this way enables the metabase to have a high speed search performance due to the database size being small compared to the actual backed up file sizes, and allows a simple search procedure to be used for the file/segment database.

In another example, the file/segment and metadata databases are combined into a single database. Such a system offers a simplified structure in the sense that only a single database is required.

Figure 4:
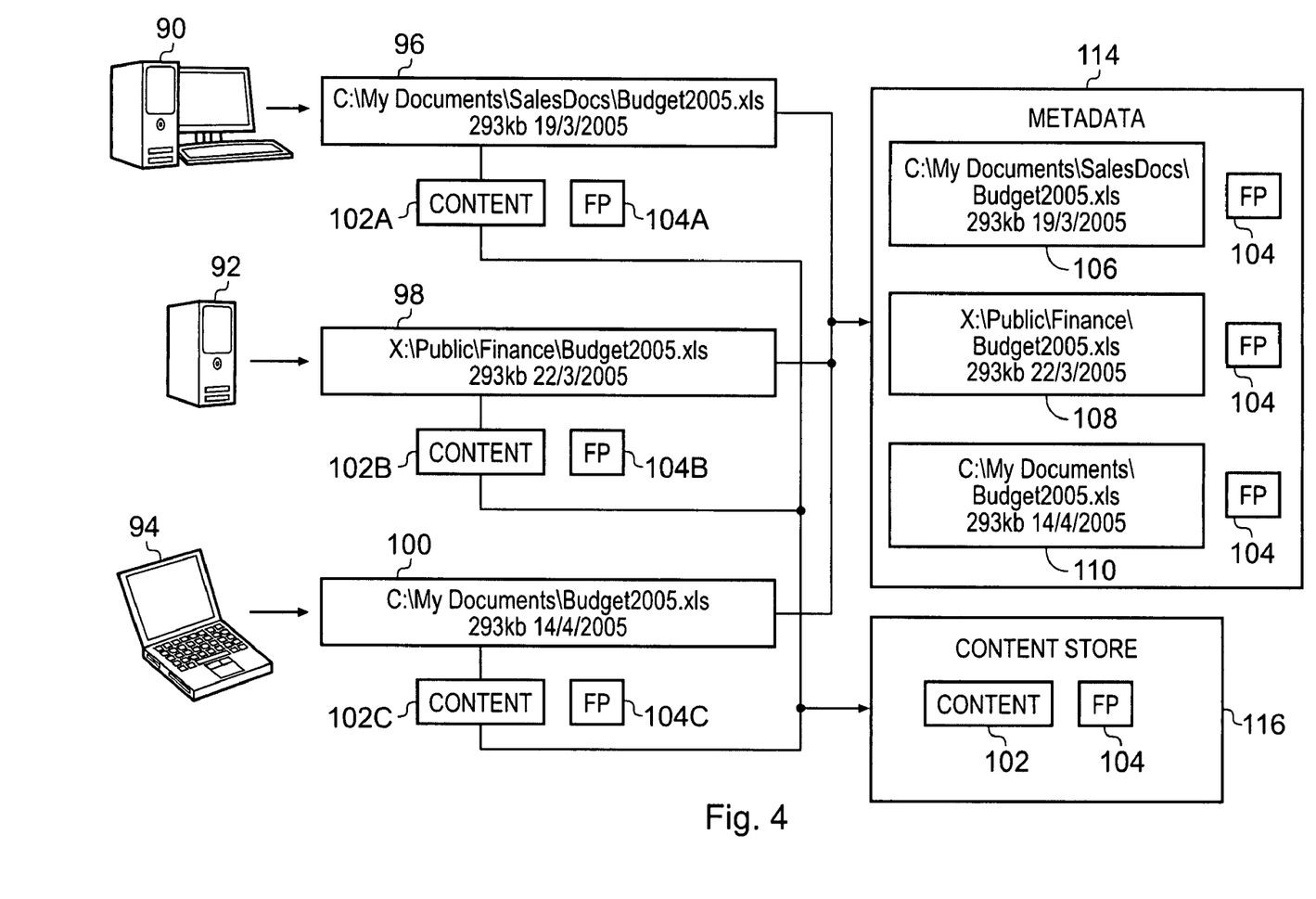
FIG. 4 shows a schematic representation of a single instancing backup system.

Returning to the separate metabase and file/segment store example, this system can be run as a single instancing store by allowing more than one entry in the metabase to include the same fingerprint. This is illustrated in FIG. 4.

In each of the three computer devices: terminal 90, file server 92 and mobile terminal 94, an identical spreadsheet file "Budget2005.xls" is stored. At the terminal 90, the file 96 was stored in the "C:\My Documents\SalesDocs\" folder on 19 Mar. 2005 having a size of 293 kB. At the file server 92, the file 98 was stored in the "X:\Public\Finance\" folder on 22 Mar. 2005 having a size of 293 kB. At the mobile terminal 94 the file 100 was stored in the "C:\My Dcouments\" folder on 14 Apr. 2005 having a size of 293 kB. As the files 96, 98, 100 are identical, they are all the same size, have the same content (102A, 102B, 102C respectively) and result in the same fingerprint FP (104A, 104B, 104C) being generated at a backup operation time.

Backup operations on each of the terminal 90, file server 92 and mobile terminal 94 may be carried out at different times, with the results of the backup of each being added into the backup system at the respective different times. For example, a backup operation for the mobile terminal 94 may be carried out at a time different to the backup operation for the terminal 90 or file server 92 if the mobile terminal 94 remains unconnected to the backup system for a period of time during which a scheduled backup operation took place for the terminal 90 and file server 92.

For the performance of a backup operation for the terminal 90, the fingerprint 104A is calculated for the file 96, which fingerprint 104A is compared to the content store part 116 of the backup system. If the fingerprint is unique in the backup system, then the content 102A of the file 96 needs to be stored into the content store 116, shown as content 102 associated with fingerprint 104. If the fingerprint is not unique in the content store (i.e. if that file has previously been backed-up), then the content need not be stored again. In parallel with determining whether the content 104A needs to be stored, metadata 106 for the file 96 is stored into the metabase 114 if the file 96 has not previously been backed-up. The metadata 106 is stored in association with the fingerprint 104 which identifies the content 102 stored in the content store 116.

Similar processes are carried out when the file 98 on file server 92 and the file 100 on mobile terminal 100 are selected for backup. Thus, once the files 96, 98, 100 have each been included in a backup process, the metabase contains an entry for each of the files, as each has different metadata, but the content store has only a single copy of the file. In an alternative implementation, the metabase could have a single record for each fingerprint, with the record storing the metadata for all original instances of the file which generated the fingerprint.

Thereby, a metabase containing metadata for all original instances of a file can be provided to provide a searchable environment for retrieving files/segments stored in the content store. Meanwhile the content store contains only one instance of each file/segment, so as to limit the storage space required by the content store. The metabase records are linked to the content records in the content store by the fingerprint for each respective content record.

Thus there has now been described a system for providing a content optimised backup and/or archival solution for data networks. The system ensures that all unique data is stored whilst avoiding unnecessary storage of non-unique data. By analysing large data objects in segments, this optimisation is further enhanced.

There will now be described an arrangement for further enhancing the content optimised data backup/archival system described above. In particular, the method of determining whether a particular file or segment is previously stored is optimised by using a content routing based approach to determining storage location.

An example of a storage server system operable to store files and segments efficiently will now be described with reference to FIG. 5. The system of the present example avoids the use of broadcasts to all storage nodes and avoids the use of a storage controller for accessing the storage nodes.

Figure 5:
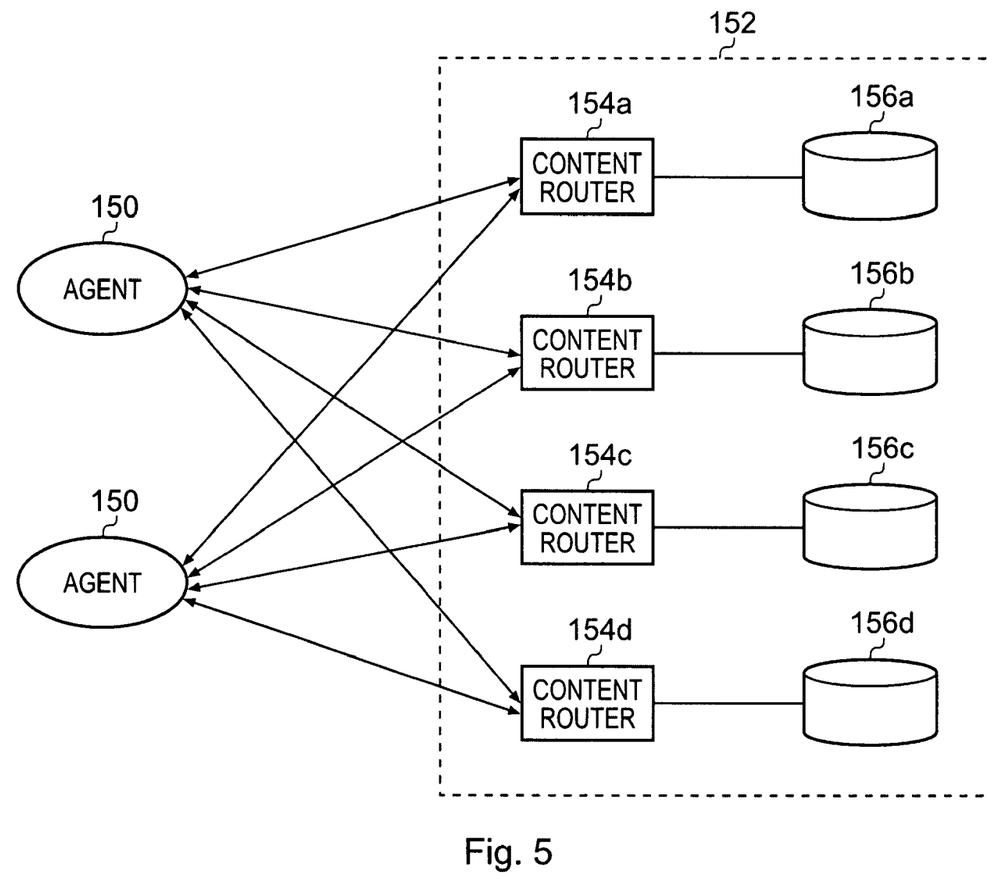
FIG. 5 shows a schematic representation of a 1-tier content routing system.

As shown in FIG. 5, individual storage agents 150 have access to a storage backend 152. Each agent 150 may be located at an individual terminal or workstation such as those shown as elements 40 in FIG. 2, or in a backup sever such as those shown as elements 42 in FIG. 2. The location of the agents can be altered in dependence upon the scale and particular implementation details of the system in question.

FIG. 5 also shows the storage backend 152 to include a number of storage elements 156a-d, each of which has an associated content router 154a-d. The storage backend 152 may be considered as equivalent to the storage pool 20 illustrated in FIG. 1. As will be appreciated, the storage backend 152 may well be made up of one or more logical storage systems overlaid onto a physical storage system. The physical storage system may include various individual physical storage servers, such as those shown as elements 50 in FIG. 2, which servers may be configured as part of a higher level storage arrangement such as a storage area network (SAN), such as that illustrated as element 52 in FIG. 2.

The locations of the logical elements of the storage backend 152 may be spreads across one or more elements or levels of a physical storage system. In the context of the example of FIG. 2, the content routers 154 may be provided in the backup server 42. Alternatively, they could be provided somewhere within the SAN 52, which could include a physical location on one of the storage servers 50. Again, using the context of the example of FIG. 2, the storage elements 156 may be provided in the backup server 42 or within the SAN 52, which could include a physical location on one of the storage servers 50. In some examples, each content router may be a separate physical or logical processing engine having storage attached directly or indirectly thereto in the form of a SAN, NAS, SCSI, iSCSI, IDE, ATA, SATA, SAS or other conventional storage technique. The storage may be redundant storage such as may be provided using a RAID system.

Figure 6:
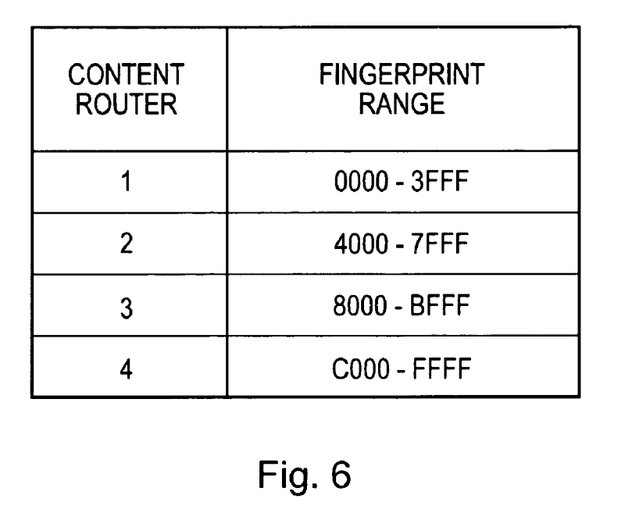
FIG. 6 shows a schematic representation of a content routing table.

In order to distribute the stored data between the various content routers, a content routing table is propagated about the network to all of the storage agents. This routing table indicates a correct storage router for each file or segment. An example of a content routing table is shown in FIG. 6. As can be seen from FIG. 6, the files and segments are distributed between the content routers by fingerprint. As each storage agent knows from the table the correct content router for a given file or segment for the fingerprint, that agent can simply direct any query regarding that file or segment to the correct content router. By providing a completely deterministic system in this fashion, a minimum amount of agent to content routers bandwidth is used for each query.

The content routing table can be determined by a central authority, and distributed to all agents. The authority may be an automated storage management authority or may be one or more human administrators.

As the fingerprint is the basis for the storage location decision, in a system which uses a checksum type system for signature creation, the allocation of files/segments to storage locations is effectively random, thereby tending to protect any single content router taking an excessive share of the storage burden.

Also, as the fingerprint is the basis for the storage location decision, as the fingerprint value range is predefined, the table automatically includes an entry for every file/segment such that the table does not need to be updated to include new files/segments as they are added to the system.

As the routing decision is based on the fingerprint, which is in turn based on the content of the file or segment, it is clear that the storage location routing decision in the present examples is made on the basis of the data content of the file or segment. Any metadata associated with the file or segment can be stored with the data file or segment, or in a separate metabase (as discussed above), however the metadata is not used for the routing decision. This helps to maintain the high degree of randomness in the storage location decision.

In the example of FIG. 6, the fingerprint for each file or segment is 128 bits in length (32 hex characters). The four most significant characters of the fingerprint are used in the content routing table. In other examples, the fingerprints may be of different lengths and/or a different number of most significant characters can be used in the content routing table.

In the present example, where the most four significant characters of the fingerprint are used for content routing, up to FFFF content routers can be provided (i.e. 64 k=65535 content routers). If each content router is associated with a data storage element or data storage elements totalling 2 TB (2 terabytes) in size, this means a total storage volume of up to 128 PB (128 petabytes) can be accommodated. This total volume can be increased or decreased to match the needs of particular backup/archival environment by using more or fewer characters of the fingerprint and/or by using larger or smaller data storage elements for each content router.

Thus there has now been described a system and method for maximising the use of available bandwidth between a storage agent and a number of storers. By determining the correct storer at the storage agent using an identifier based on the content of a data object and a table matching possible identifiers to available storers, any query regarding the data object can directed to the correct storer. Thereby storers other than the one indicated in the table need not receive any communication relating to the data object. Thus bandwidth between agent and storers is not wasted by troubling storers with queries regarding data objects for which they have no responsibility.

The content routing system described above can be modified and adapted to suit a number of different circumstances and requirements.

For example, the address ranges on the content routing table can be weighted to respond to operational needs. For example, if one particular range of values in the content routing table becomes more "busy" than the other ranges, that range can be served by multiple load-balanced content routers. Referring to the example of FIG. 6, if the content router serving the address range 4000-7FFF becomes disproportionately loaded, an extra content router can be allocated the same address range and the two content routers can be configured to transparently share the load of that address range between them.

Figure 7:
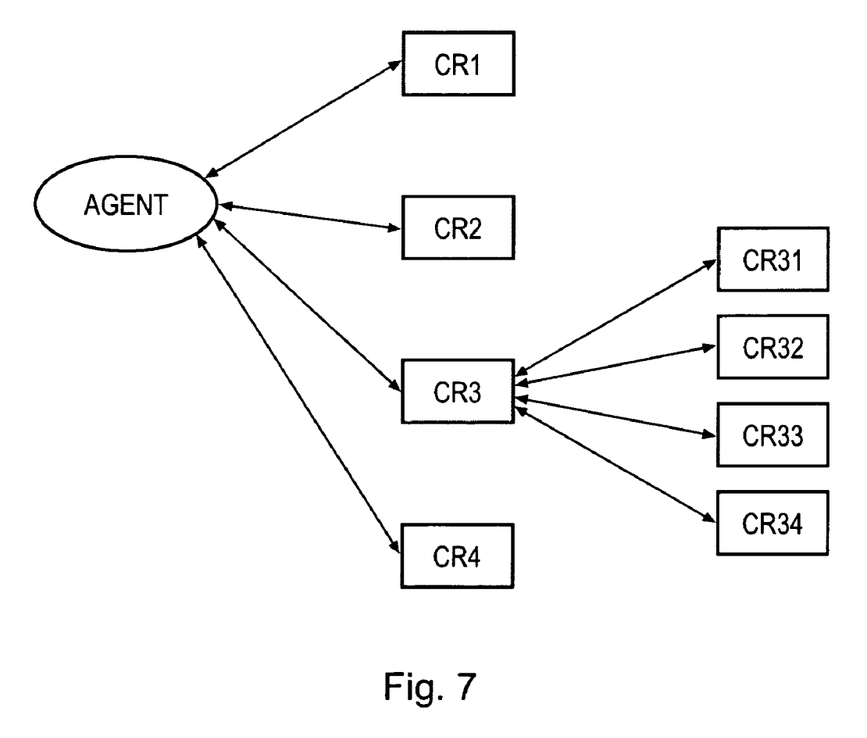
FIG. 7 shows a schematic representation of a two-tier content routing system.

In some examples, load balancers can be "stacked" such that each storage agent sees a first group of content routers which can be accessed through the content routing table. Then, one or more members of that first group of content routers may feed further groups of content routers. With reference to FIG. 7, content router CR3 which serves address range 8000-BFFF (using the content routing table of FIG. 6) may itself feed a further set of content routers CR31, CR32, CR33 and CR34, thereby acting as an agent in respect of those further routers. These may be used to serve the address ranges 8000-8FFF, 9000-9FFF, A000-AFFF and B000-BFFF respectively. Alternatively, they may be configured to provide additional reliability by providing failover paths. For example CR31 and CR32 may both be configured to handle addresses in the range 8000-9FFF with CR31 as the default path and CR32 as a mirrored failover path. Likewise CR33 and CR34 may both be configured to handle addresses in the range A000-BFFF with CR33 as the default path and CR34 as a mirrored failover path.

In some examples, both the first tier content router CR3 and the second tier content routers CR31, CR32, CR33 and CR34 may store data. In this situation the first tier router CR3 acts as an agent to determine whether to send a query/data for storage to a second tier router or whether to keep it for its own storage.

In some examples, different content routers might have different size address spaces to handle. For example if two content routers are provided with a capacity of 1 TB each, and a third content router is provided with a capacity of 2 TB, the system could be configured to allocate an address space to the 2 TB content router which is twice the width of the address space allocated to each 1 TB content router.

In order to enable the total volume of the backup/archival system to be scaled dynamically, a content routing table can be updated to allow additional content routers to be accessed. An example of dynamic scaling is illustrated in FIG. 8.

Figure 8:
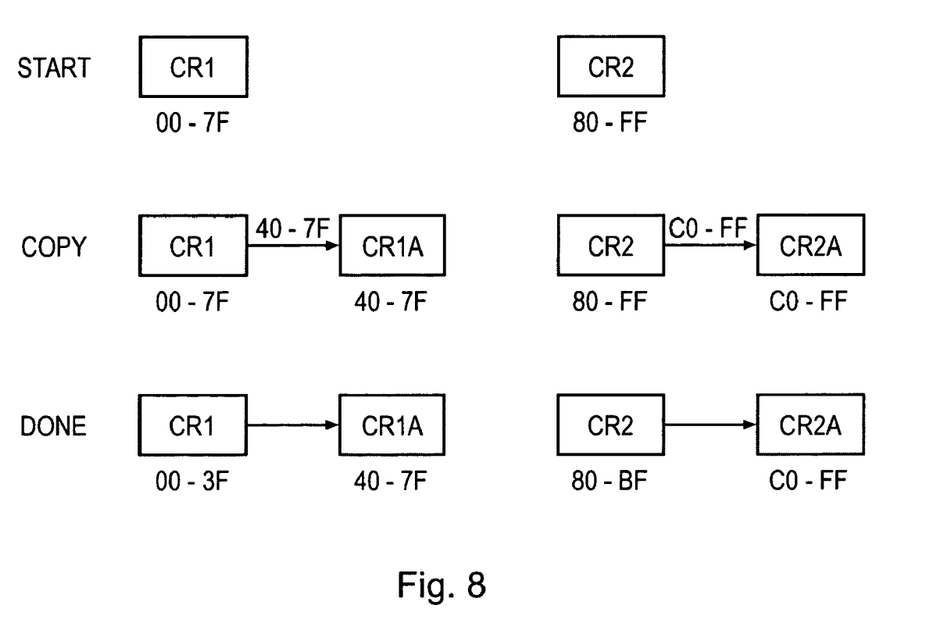
FIG. 8 shows a schematic representation of a dynamic resizing operation for a tier of a content routing system.

As shown in FIG. 8, before the dynamic scaling operation, the system comprises two content routers, with CR1 handling addresses in the range 00-7F and CR2 handling addresses in the range 80-FF. The system is at this point in need to expansion as each content router is experiencing high utilization. In one example, a threshold maximum utilization might be 90% utilization. Thus, if in the present example, each content router is responsible for 2 TB of data storage elements, the system can reach a stored data volume of 3.6 TB before expansion is required.

In order to increase the data storage volume, it is decided in the present example to introduce two new content routers, thereby bringing the total system utilization down to 45%. Thus, each of CR1 and CR2 copies the data corresponding to the upper half of its respective address range to new content routers CR1A and CR2A respectively. If it is desired to perform this system resizing dynamically (i.e. without making the system unavailable for the duration of the update) the original content routers can continue to handle queries for their entire original address range during the copy process. Alternatively, the new content routers can be placed in service immediately, using a present and previous location system to accurately route files/segments. Such a system will be described in greater detail below. Finally, after the copy is complete, there are four content routers in the system, with CR1, CR1A, CR2 and CR2A servicing addresses in the ranges 00-3F, 40-7F, 80-Bf and C0-FF respectively.

Other systems for adding content routers may be employed. For example, a single content router could be added and the addresses handled by each existing n content routers shuffled along to cover the n+1 content routers now present.

As mentioned above, during a dynamic reconfiguration of the backup/archival system, a new content router may be pressed into service as soon as it is connected. In this situation it will be appreciated that the amount of data actually stored at the new content router will be very small initially, with the amount increasing as the copy from the existing content router(s) proceeds. Moving large quantities of data can take a considerable period of time, especially where data integrity is a high priority, for example moving 1 TB of data from one content router to another could take up to 1-2 days. During this time, a given file/segment may be available from either the original or the new content router. To handle this situation a present and previous system can be implemented, as will now be discussed with reference to FIG. 9.

Figure 9:
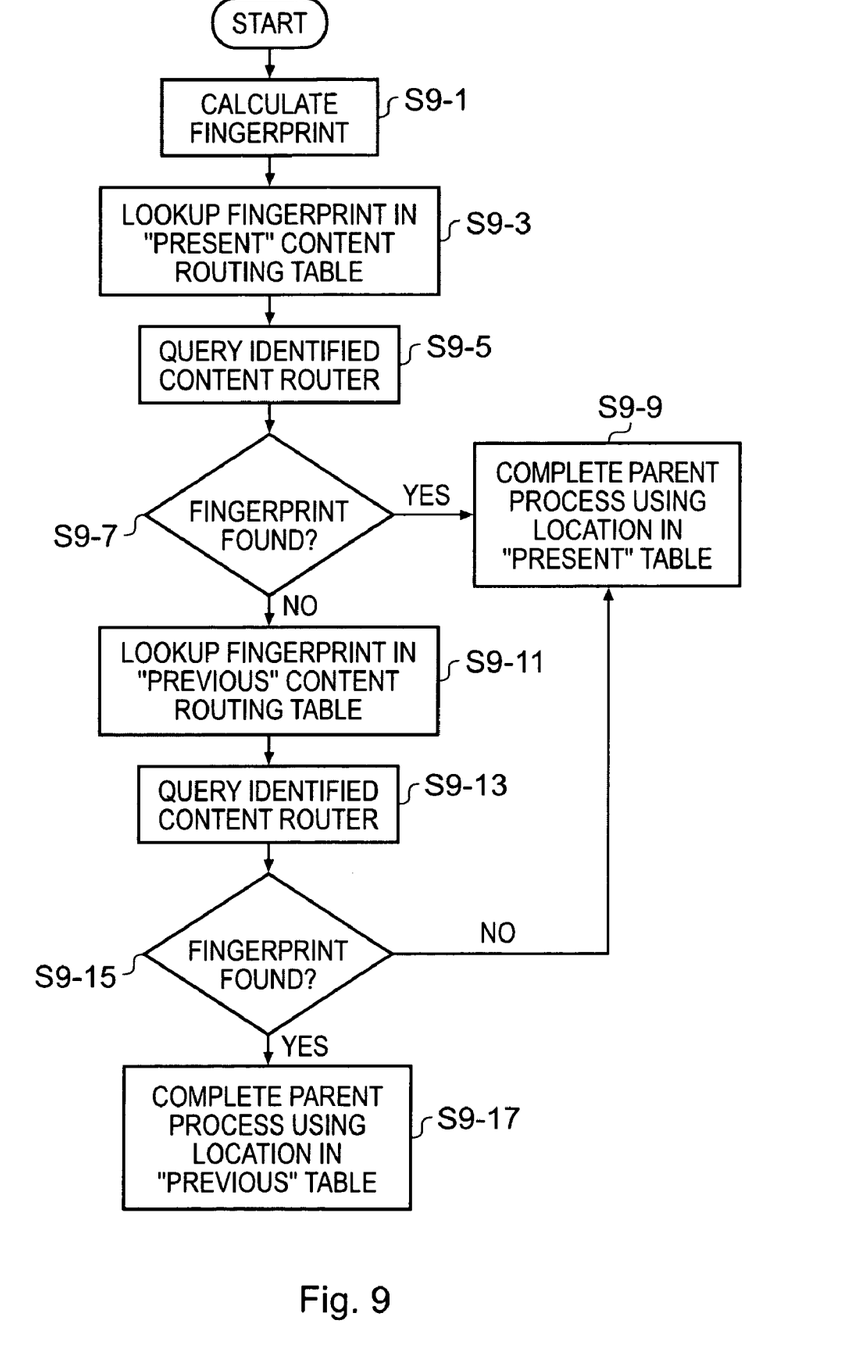
FIG. 9 is a flow diagram illustrating a present and previous content routing system for use during a dynamic resizing operation.

The present and previous system can be implemented using two content routing tables at each storage agent. The "present" table gives the location of the data as it will be once the resizing operation has been completed and the "previous" table gives the location of the data as it was before the resizing operation started. It will therefore be appreciated that the "present and previous" system may also be considered to be a "future and current" system.

A query directed to the content routers therefore commences at step S9-1 with a fingerprint being determined for the file/segment being considered. This fingerprint is then looked-up in the "present" content routing table at step S9-3. The content router identified in the "present" table is then sent a query containing the fingerprint at step S9-5. A response from that content router is then considered at step S9-7. If the content router returns a result indicating that it has a stored file/segment with that fingerprint then processing continues at step S9-9 where the parent process (e.g. a write operation, a re-write operation or a retrieval operation) is completed using the content router found in the "present" table. Thus the file/segment has been found to be in its "new" location and the operation is carried out on that location.

If, on the other hand, the content router returns a result indicating that it does not have a stored file/segment with that fingerprint then processing continues at step S9-11 where the fingerprint is compared to the "previous" content routing table. The content router identified in the "previous" table is then sent a query containing the fingerprint at step S9-13. A response from that content router is then considered at step S9-15. If the content router returns a result indicating that it does not have a stored file/segment with that fingerprint then processing continues at step S9-9 where the parent process (e.g. a write operation, a re-write operation or a retrieval operation) is completed using the content router found in the "present" table. Thus, if the file/segment is stored nowhere, the operation is carried out with reference to the desired location for that file/segment under the new content routing table.

If, on the other hand, the content router returns a result indicating that it does have a stored file/segment with that fingerprint then processing continues at step S9-17 where the parent process (e.g. a write operation, a re-write operation or a retrieval operation) is completed using the content router found in the "previous" table. Thus the file/segment has been found not yet to have been moved to be in its "new" location and the operation is carried out the "old" location.

Optionally, a check can be performed between steps S9-11 and S9-13 to determine whether the content router identified by the previous content routing table is the same as the content router identified by the present content routing table. If the same content router is identified by both tables, the second query step and subsequent consideration of the result (steps S9-13 and S9-15) can be ignored and the "present" table used to complete the process (step S9-9). This is because if the first identified content router did not have the file/segment and the same content router is identified for the second check, the file/segment is not going to be found at the second attempt, and thus the result of the second query is already known. Thus an unnecessary query can be avoided, saving both query channel bandwidth and load at the content router.

Thus there has now been described a system and method for dynamically resizing a content routing based backup/archival system. During a resizing operation, queries can be run against both new and old locations for a given content item to ensure that the integrity of the backup/archival system is maintained.

Figure 10:
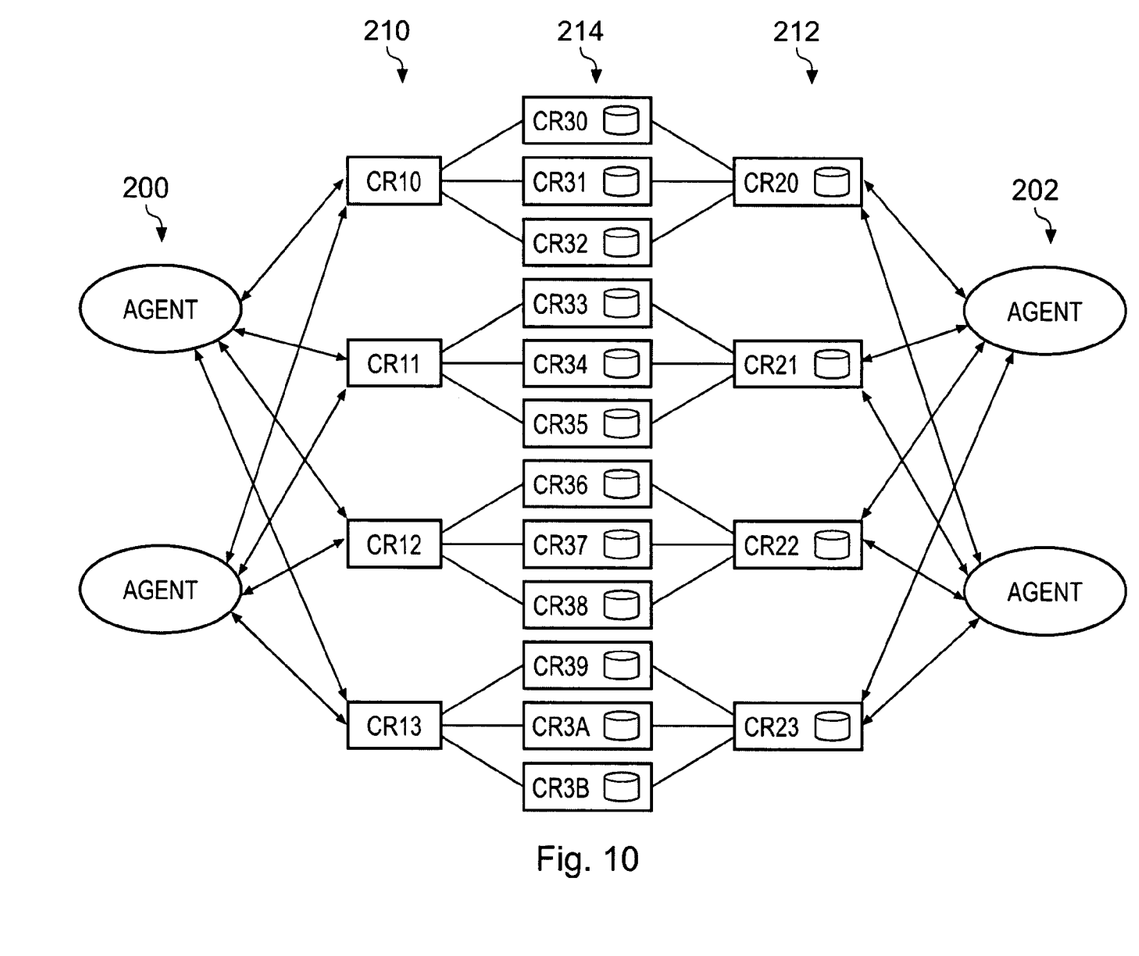
FIG. 10 shows a schematic representation of a three-tier content routing system.

Although it has been described above that the content routing table is distributed to all storage agents, it is not necessary to provide the same content routing table to all agents. This might be appropriate where a system of stacked content routers is used. Thus a first group of storage agents might be directed to a first group of content routers and the second group of storage agents might be directed to a second group of content routers, where each of the first and second content router groups have links to a third group of content routers which handle the actual data storage. Thus queries from agents in different physical locations can be handled by different front-end content routers, with the different front-end content routers all being connected to back-end content routers which handle the actual data storage and retrieval. This possibility is illustrated in FIG. 10, where a first group of agents 200 connect to a first front-end group of content routers 210 and a second group of agents 202 connect to a second front-end group of content routers 212. Additional data storage is provided by a third group of content routers 214. Thus, in the present example where there are a total of 16 storage nodes (content router group 210 do not have storage), the path from a given agent to the required node may be long and pass through one or more content routers which are not the allocated content router for that data. For example, if a fingerprint leads to CR22, an agent in group 202 can access this content router directly. However, for an agent in group 200, the content routing table therein will indicate CR12 as the correct content router. At CR12 a different content routing table will indicate one of CR36, CR37 or CR38 as the correct router. The one of CR36, CR37 or CR38 may be defined in the content routing table at CR12 in dependence upon a query handling capacity of each of those nodes. In one example, the fingerprints for which CR22 is the ultimate content router for may be split equally between CR36, CR37 and CR38 in the content routing table at CR12. For the purpose of this example, we will assume that CR38 is selected. Then, at CR38 the fingerprint is compared to the content routing table and CR22 identified. Finally, at CR22, the fingerprint is compared to its content routing table which indicates that the correct node has been reached. The query or operation can now be carried out and the result returned to the requesting agent.

Different content routing tables for different agents may also be used where the agent is in fact within a content router within a stacked content router system such as that illustrated with reference to FIG. 7 above. Each content router which has other content routers attached will need a content routing table to determine which connected content router a query or data for storage should be forwarded to. In a multi-level stacked system, where there are many cross-links between content routers, there may be preferred paths established for different fingerprints between any two given routers. Different content routing tables may also be used where an agent is used within the storage system for data replication rather than data storage.

Although it has been described above that each content router has storage element(s) associated therewith, this is not necessary and some content routers may have no storage elements associated therewith. Such content routers may typically be deployed as intermediary content routers in a stacked arrangement of content routers. This is illustrated in FIG. 10, where the first front-end group of content routers 210 have no storage associated therewith, whereas the second 212 and third 214 groups of content routers do have storage associated therewith.

Thus there have been described various approaches to implementing a content routing system for a file archival/backup system. Thereby a greater efficiency of storage can be effected in the archival/backup system.

The invention claimed is:

1. A distributed storage system comprising:
   a storage agent operable to perform a look-up in a routing table to determine a routing node for a data object on the basis of an identifier therefore, the identifier for the data object being based on data content thereof, and to send a message including the identifier relating to that data object to the identified routing node; and
   a plurality of routing nodes, each operable to perform a look-up in a routing table to determine a further routing node for a data object described in an identifier included in a message received at the routing node, and to forward the message to the identified further routing node;
   wherein at least a subset of the routing nodes are each operable to store data objects having an identifier within a predetermined range, and wherein the routing table for each such node indicates that the further routing node is the current node for identifiers within said predetermined range.

2. The system of claim 1, wherein the routing table at the agent and the routing tables at the routing nodes are different.

3. The system of claim 1, wherein the data object is a data file or a data file segment.

4. The system of claim 1, wherein the identifier is a checksum value for the data object.

5. The system of claim 1, wherein the routing table at the storage agent contains an indication of a routing node for every possible identifier value.

6. The system of claim 1, wherein the routing table at each routing node contains an indication of a routing node for every identifier value which can be caused to arrive at that routing node.

7. The system of claim 1, wherein the storage agent is operable to use two routing tables to determine a routing node, and wherein at least each routing node which is directly addressable by the storage agent is operable to use two routing tables to determine a further routing node.

8. The system of claim 7, wherein a first routing table indicates a new routing node for the identifier and wherein a second routing table indicates an old routing node for the identifier.

9. The system of claim 8, wherein one of the two routing tables includes at least one routing node which is a member of the subset of routing nodes and does not currently have a copy of all data described in that routing table.

10. The system of claim 1, wherein at least one routing node of the at least a subset of routing nodes is operable to store a data object in a storage element of the routing node.

11. The system of claim 1, wherein at least one routing node of the at least a subset of routing nodes is operable to store a data object in a storage element directly or indirectly attached to the routing node.

12. The system of claim 1, wherein the message is a query to determine whether any of the routing nodes has a responsibility for a stored copy of the data object.

13. The system of claim 1, wherein the message is a request to store the data object.

14. The system of claim 1, wherein only a single copy of the data object is to be stored within the system.

15. The system of claim 1, wherein the message is a request to retrieve a copy of the data object.

16. A distributed storage system comprising:
    means for performing a look-up in a routing table to determine a routing node for a data object on the basis of an identifier therefore, the identifier for the data object being based on data content thereof, and for sending a message including the identifier relating to that data object to the identified routing node; and
    a plurality of routing means, each for performing a look-up in a routing table to determine a further routing means for a data object described in an identifier included in a message received at the routing means, and for forwarding the message to the identified further routing means;
    wherein at least a subset of the routing means are further for storing data objects having an identifier within a predetermined range, and wherein the routing table for each such routing means indicates that the further routing means is the current routing means for identifiers within said predetermined range.

* * * * *